United States Patent [19]

Keen

[11] Patent Number: 5,219,032
[45] Date of Patent: Jun. 15, 1993

[54] MICROWAVE ELECTRONIC LOAD MEASURING SYSTEM

[75] Inventor: Harry J. Keen, St. Johnsbury, Vt.

[73] Assignee: Fairbanks Inc., Kansas City, Mo.

[21] Appl. No.: 851,081

[22] Filed: Mar. 13, 1992

[51] Int. Cl.⁵ .......................... G01G 3/14; G01L 1/10
[52] U.S. Cl. ............................ 177/210 FP; 73/862.59
[58] Field of Search ............... 177/210 FP; 73/862.59

[56] References Cited

U.S. PATENT DOCUMENTS

| | | | |
|---|---|---|---|
| 2,494,570 | 1/1950 | Mezger . | |
| 2,615,332 | 10/1952 | Quinn . | |
| 2,914,310 | 11/1959 | Bahrs . | |
| 3,263,166 | 7/1966 | Augustine et al. . | |
| 3,314,493 | 4/1967 | Kennedy | 177/210 FP |
| 3,482,161 | 12/1969 | Poulter . | |
| 3,577,071 | 5/1971 | Collins . | |
| 3,636,752 | 1/1972 | Ishii . | |
| 3,680,650 | 8/1972 | Zimmerer . | |
| 3,722,285 | 3/1973 | Weber | 73/382 G |
| 3,722,287 | 3/1973 | Weber | 73/382 G |
| 3,722,288 | 3/1973 | Weber | 73/382 G |
| 3,772,286 | 3/1973 | Weber | 73/382 G |
| 4,070,900 | 1/1978 | Engels . | |
| 4,106,329 | 8/1978 | Takahashi et al. . | |
| 4,273,204 | 6/1981 | Gillen | 177/210 C |
| 4,297,874 | 11/1981 | Sasaki | 177/210 FP |
| 4,372,405 | 2/1983 | Stuart . | |
| 4,464,725 | 8/1984 | Briefer . | |
| 4,549,439 | 10/1985 | Keen et al. . | |
| 4,556,115 | 12/1985 | Lockery et al. . | |
| 4,565,979 | 1/1986 | Fiedziuszko | 331/117 D |
| 4,585,082 | 4/1986 | Harrington et al. . | |
| 4,623,030 | 11/1986 | Portman, Jr. et al. . | |
| 4,623,813 | 11/1986 | Naito et al. . | |
| 4,711,313 | 12/1987 | Iida et al. . | |
| 4,712,627 | 12/1987 | Harrington et al. . | |
| 4,750,082 | 6/1988 | Gerety . | |
| 4,754,823 | 7/1988 | Baumann . | |
| 4,799,558 | 1/1989 | Griffen . | |

(List continued on next page.)

FOREIGN PATENT DOCUMENTS 1123211 8/1968 United Kingdom .

OTHER PUBLICATIONS

Zaki & Atia, *Modes in Dielectric Loaded Waveguides and Resonators,* IEEE Transactions on Microwave Theory and Techniques, vol. MTT-31, No. 12, Dec. 1983, pp. 1039-1044.

Richtmyer, R. D., *Dielectric Resonators,* Journal of Applied Physics, vol. 10, Jun. 1939, pp. 391-398.

(List continued on next page.)

*Primary Examiner*—George H. Miller, Jr.
*Attorney, Agent, or Firm*—Bryan Cave

[57] ABSTRACT

An electronic weighing system is disclosed which, employs spaced cylindrical dielectric rings as the load measuring transducer. A support structure is provided to linearly vary the spacing between the rings responsive to applied load which will linearly vary the resonant frequency of the rings. In an active mode, each microwave load cell is excited by an unstable oscillator, the dielectric rings stabilizing the oscillator at a resonant frequency which is proportional to their spacing. The oscillation frequency of the load cell is measured and used to compute the magnitude of the load applied to the cell based upon a predetermined relationship between output frequency and load. A plurality of multiplexed load cells may be employed. In a passive mode, a voltage controlled oscillator generates a microwave signal which linearly sweeps a preset frequency band. The sweeping signal is applied across the dielectric rings which generate a detectable pulse at their primary resonant frequency. The pulse is detected and the resonant frequency at which the pulse was generated is determined. The applied load is calculated from the resonant frequency and routed to a display panel. In a temperature compensation embodiment, a temperature sensor generates a voltage output which is converted to an RF signal and modulated onto the microwave oscillator output.

11 Claims, 8 Drawing Sheets

U.S. PATENT DOCUMENTS

| | | |
|---|---|---|
| 4,836,308 | 6/1989 | Davis et al. . |
| 4,838,369 | 6/1989 | Albert . |
| 4,856,603 | 8/1989 | Murakoso et al. . |
| 4,898,254 | 2/1990 | Fukui . |
| 4,913,248 | 4/1990 | Zakai . |
| 4,917,199 | 4/1990 | Loshbough . |
| 4,951,764 | 8/1990 | Brand . |
| 4,960,177 | 10/1990 | Holm-Kennedy et al. . |
| 4,967,384 | 10/1990 | Molinar et al. . |
| 4,984,128 | 1/1991 | Cebon et al. . |
| 5,004,059 | 4/1991 | Webster . |

OTHER PUBLICATIONS

Courtney, W. E., *Analysis and Evaluation of a Method of Measuring the Complex Permittivity and Permeability of Microwave Insulators*, IEEE Transactions on Microwave Theory and Techniques, vol. MTT-18, No. 8, Aug. 1970, pp. 476–485.

Hernandez-Gil, F., Perez-Leal, R., and Gebauer, A., *Resonant Frequency Stability Analysis of Dielectric Resonators with Tuning Mechanisms*, 1987 IEEE MTT-S Digest, pp. 345-348.

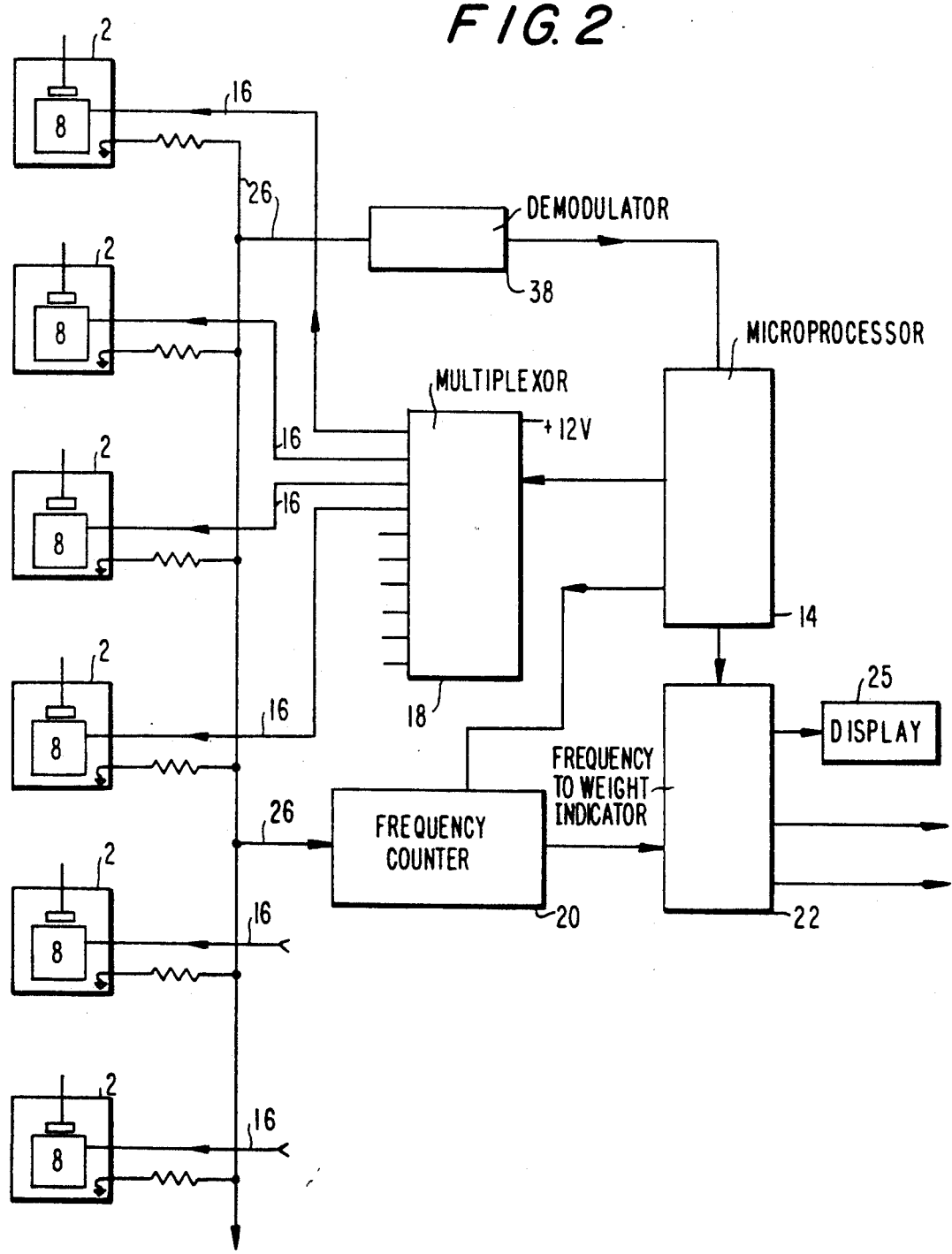

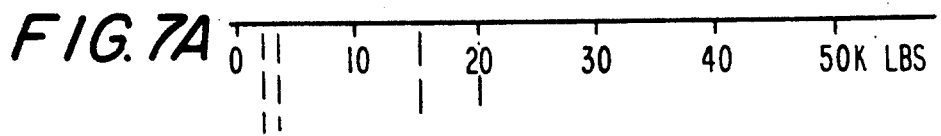
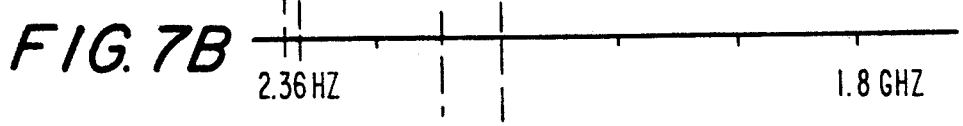
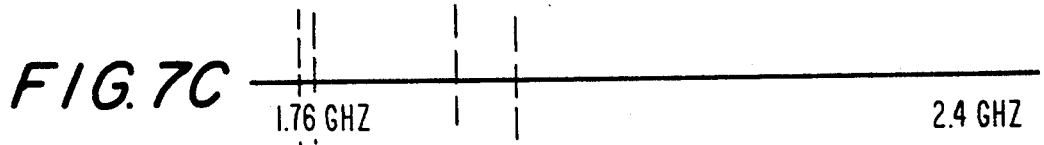
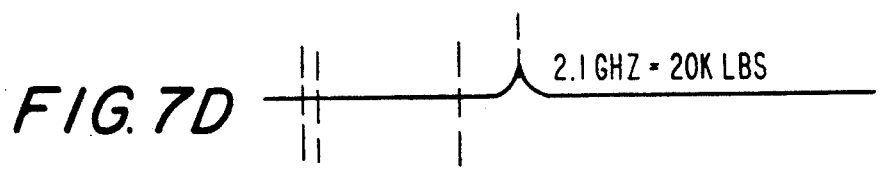
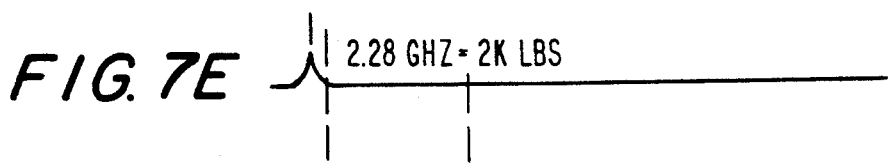
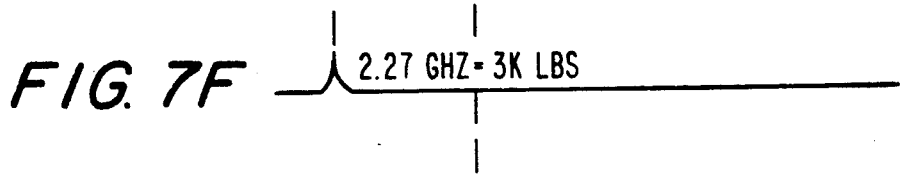
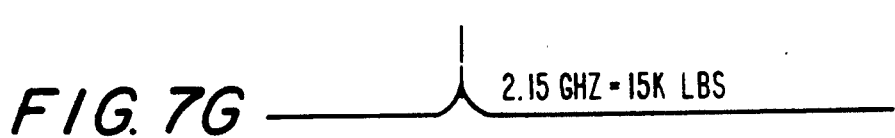

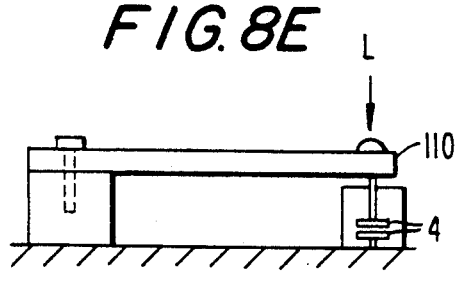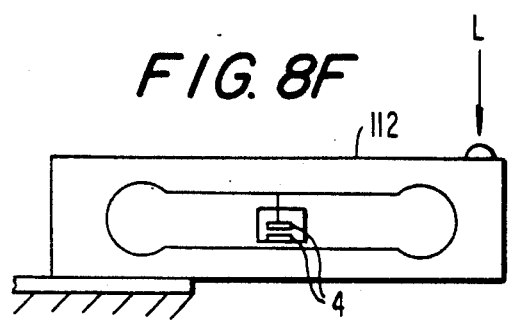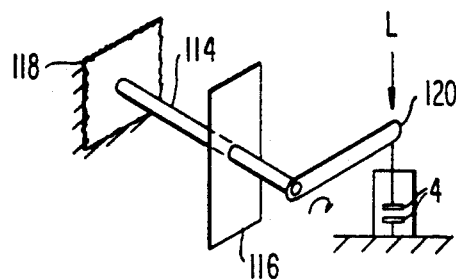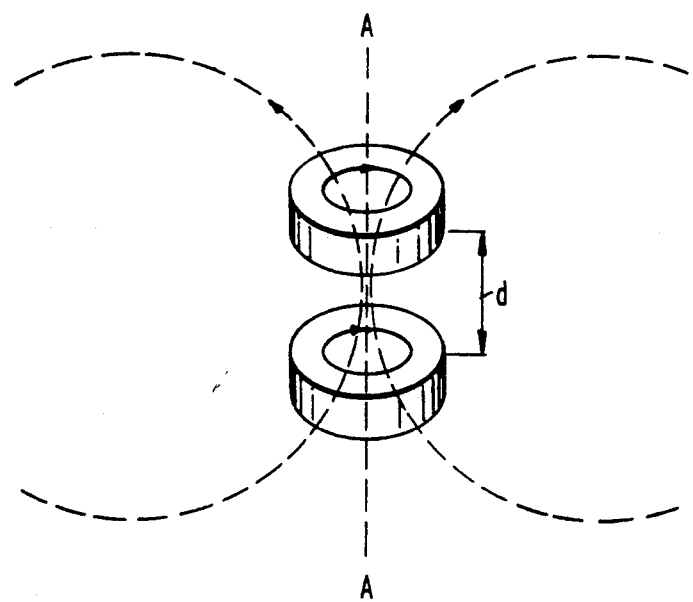

MICROWAVE ELECTRONIC LOAD MEASURING SYSTEM

BACKGROUND OF THE INVENTION

I. Field of the Invention.

The present invention relates generally to electronic measuring systems and more particularly to an electronic weighing system utilizing microwave frequency dielectric resonant load cells to provide highly accurate digital load measurements including temperature compensation.

II. Description of the Prior Art

Various types of transducers have been developed for measuring loads. In the simplest type of prior art mechanical scales, a load is applied to a mechanical load receiving member, such as a calibrated spring assembly and platform, in order to mechanically control a balance mechanism to provide a weight indication. Such systems are used for example in conventional portable beam scales, bench scales, or health scales.

In addition, prior art electronic systems which measure weight to provide an electronic display based on a load applied to a transducer, such as an analog load cell or a digital load cell, such as disclosed in U.S. Pat. Nos. 3,850,023; 3,665,169; 3,603,298; 4,330,837; 4,143,724; 4,722,406; and 4,137,568 are also well known.

Typically, in prior art electronic scales, a continuous voltage is applied across a load cell arranged in a wheatstone bridge. The voltage across the load cell output is measured, from which the magnitude of the load applied to the load cell is determined.

Another conventional type of load cell employed in prior art scales is a capacitive load cell. In the capacitive load cell, the load cell is connected so that its capacitance will change in proportion with the weight on the scale, an oscillator being connected in the circuit so that the change in capacitance is directly proportional to change in frequency of the oscillator. Such prior art systems are exemplified by U.S. Pat. Nos. 4,273,204, 4,951,764, 4,898,254, 4,917,199, 4,712,627, 4,372,405, 3,314,493, and 4,585,082.

Another type of prior art transducer which has been employed is the piezoelectric transducer, such as disclosed by way of example in U.S. Pat. Nos. 4,623,813 and 4,623,030.

Moreover, heavy capacity prior art weighing systems typically employ a plurality of strain gages mounted at the base of a large weighing platform. These scales are often exposed to the natural elements, which include moisture, temperature variations, humidity and lightning. Further, since these scales are generally expensive and, therefore, used for long periods of time, it would be highly preferable to have them utilize, if possible, load transducers which would not degrade rapidly over time. Furthermore, the accuracy of such scales may be affected by other factors such as electrical noise interference which arises due to the large distance between the strain gauges and the load determining instrumentation.

It would, therefore, be desirable to be able to overcome these problems present in the prior art by providing a load measuring transducer which is less vulnerable to electrical and environmental distortions, which is cost effective, and which is suitable for large capacity weighing systems.

SUMMARY OF THE INVENTION

The present invention is an electronic weighing system which employs a tunable double dielectric oscillator operating at microwave frequencies as the load measuring transducer. The microwave transducer employs a pair of spaced cylindrical dielectric rings to modulate a microwave frequency oscillator, such as the type of dielectric rings described in U.S. Pat. No. 4,565,979. A support structure is provided which aligns the rings along a longitudinal axis, and linearly varies the spacing between the rings responsive to a load applied to the support structure. As the spacing between the elements is changed, the resonant frequency of the rings varies.

In an active mode, each microwave load cell is excited by an unstable oscillator in close proximity to the dielectric rings. The dielectric rings stabilize the oscillator at a resonant frequency which is proportional to their spacing.

The oscillation frequency of the load cell is measured and used to compute the magnitude of the load applied to the cell based upon a predetermined relationship between output frequency and load. A plurality of active load cells may be employed if desired. In this configuration, a logic control circuit, preferably a microprocessor, multiplexes the power supply to the load cell oscillators so that only one load cell is active at a particular time. Thus, only a single output line is required from the platform section of the scale. Isolation circuitry may be provided to electrically separate the load cell portion of the invention from the electronic components.

A microprocessor is provided for controlling the timing of various system circuits and for providing a multiplexing signal to activate each oscillator in a timed relationship. The frequency of the output from the load cells is used to calculate the magnitude of the load applied to the each cell. These load values are summed to compute the magnitude of the entire load.

The oscillation frequency of the active load cell is measured by a microwave frequency counter. This value will closely correspond with the resonant frequency of the rings. A frequency-to-weight indicator calculates the spacing of the rings based upon a predetermined resonant characteristic for the load cell which relates resonant frequency to the ring spacing. Finally, the ring spacing is used to compute the magnitude of the weight applied to the load cell based upon a predetermined response characteristic for the load cell which relates the magnitude of the applied load to deflection of the dielectric rings. If more than one load cell is in use with a large platform, the frequency-to-weight indicator may store the values for each load cell and sum these values to display the composite weight of the load on the scale.

The load value which is determined by the present invention is preferably displayed on a conventional LCD display.

Alternatively, the present invention may operate in a passive mode in which a voltage controlled oscillator generates a microwave signal which linearly sweeps a preset frequency band. This sweeping microwave signal is applied across the dual-element load cell which generates a detectable pulse at its primary resonant frequency.

Since the resonant frequency of the load cell varies linearly with applied load, the output pulse will be generated by the transducer at a frequency proportional to the applied load. The output of the load cell is directed to a frequency counter which detects the pulse output from the load cell and determines the corresponding input frequency at which the pulse was generated. Based upon the resonant frequency of the load cell, the applied load is calculated and routed to a display panel.

If desired, a plurality of load cells may be employed for weighing heavy objects. In this configuration, a multiplexing system switches between the various load cells in a timed fashion, directing the detected outputs individually to the output frequency detector. As in the active mode, the load applied to each cell is measured independently, then summed to determine a total applied load value.

If desired, the load cell of the present invention, in both the active mode and the passive mode, may also include a compensation for temperature variations. A temperature sensor, preferably a conventional integrated circuit having a voltage output which varies linearly with temperature, is provided in close proximity to the load cell. The voltage output of the integrated circuit is converted, by way of example, to a 0-20 Khz frequency output. This signal is modulated onto the microwave oscillator output. In this embodiment, only a single output connection is needed from the scale platform to carry both the load cell output, by way of example, as a 1.8-2.2 Ghz carrier, and the 0-20 Khz temperature value modulated thereon. A demodulator is provided to remove the original 0-20 Khz temperature output signal from the carrier, in the above example, for conversion to a digital value. The microprocessor includes a look up table for converting the digital temperature reading to an accurate temperature value for correction of temperature related errors.

The dielectric ring based microwave load cell of the present invention is very well suited for high capacity scales. The dielectric rings allow improved resolution, and very stable environmental characteristics, including temperature coefficients of less than 2 PPM/°C. and aging of less than 3 PPM/year. The resonating circuit has a high Q factor for reduced electrical noise interference. The output line to the processing circuitry may carry both the temperature and load readings, and may be capacitively coupled to make the system more resistant to electrical damage. Additionally, by operating at microwave frequencies, a very high rate of multiplexing may be used, making it much more practical than in the prior art known to applicant to use a greater number of load cells, and to do more efficient digital filtering.

BRIEF DESCRIPTION OF THE DRAWINGS

FIG. 2 shows a block diagram of the microwave load cell of the present invention in an active multiplexed system.

FIGS. 7 A-G show sample outputs for various system components.

FIG. 9 shows a perspective view of the dielectric rings of the microwave load cell of the present invention.

DESCRIPTION OF THE PREFERRED EMBODIMENT

Figure 1:
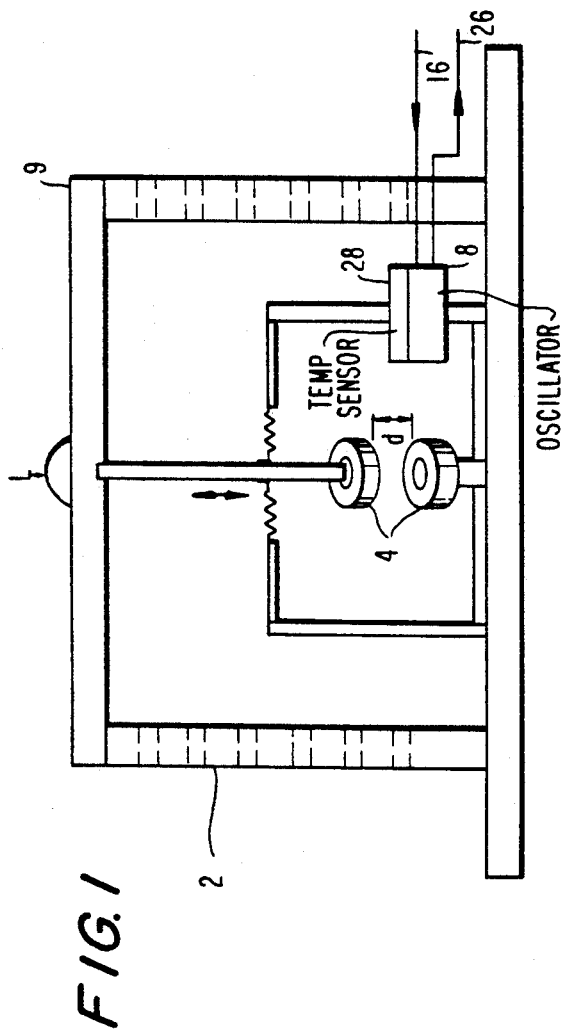
FIG. 1 shows a side view in partial perspective of the microwave load cell of the present invention.

Referring now to the drawings in detail, and initially to FIG. 1, the electronic measuring system of the present invention preferably employs at least one microwave dielectric load cell 2 to measure the weight of a load L. In the presently preferred embodiment of the present invention, a plurality of load cells 2 are used in conjunction with a conventional scale platform 9 to weigh heavy items, such as in a conventional truck scale. Load cell 2 preferably comprises a pair of dielectric resonator rings 4 aligned along a longitudinal axis. Dielectric rings 4 preferably have an associated microwave resonant frequency, such as described in U.S. Pat. No. 4,565,979, which varies substantially linearly with the spacing between the dielectric rings 4. Thus, as the spacing between the dielectric rings 4 is varied, the resonant frequency of a microwave frequency circuit including these dielectric rings 4 will change proportionately. In a alternative embodiment in accordance with the present invention, one of the dielectric rings 4 may be spaced from a conductive object, such as a metal plate for example, as opposed to using a pair of dielectric rings 4. However, this alternative arrangement will have a somewhat less linear resonant frequency-spacing curve over a range of spacing as compared to the presently preferred arrangement using a pair of spaced dielectric rings 4. If desired, a computer may be used in conjunction with this alternative embodiment in order to compensate for any non-linearities which may exist.

Referring, once again, to the presently preferred embodiment employing a pair of spaced dielectric rings 4, these dielectric rings 4 are preferably mounted in the load cell 2 so as to permit the spacing d between the dielectric rings 4 to vary when a load is applied to the weighing platform 9. The resonant frequency of the dielectric rings 4 preferably varies linearly only when the spacing d between the dielectric rings 4 is within a predetermined range. The load cell platform 9, and load cell 2 are, therefore, preferably designed, in accordance with the present invention, so that at the maximum and minimum loads, the spacing between the dielectric rings 4 is within this predetermined range. For example, if the resonant frequency of the dielectric rings 4 remained linear at a spacing between 0 and 1 mm, the platform 9 which was employed would be designed to allow a maximum of 1 mm movement between no-load and full-load.

Figure 3:
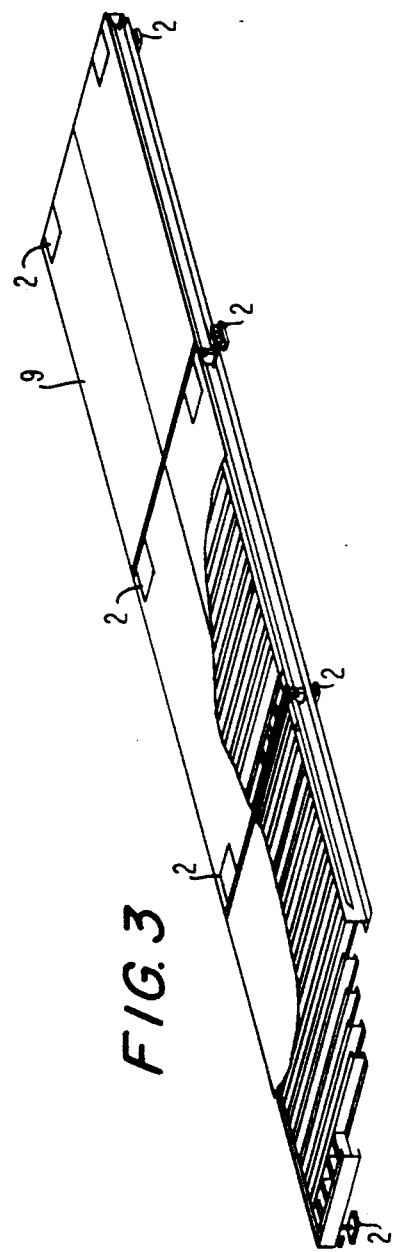
FIG. 3 shows a typical truck scale configuration.

FIG. 2 shows the load cell 2 of the present invention as used in an active multiplexed system. In this embodiment, eight load cells 2 are utilized, for example, as a truck scale and preferably configured as shown in FIG. 3. Each load cell 2 preferably includes a microwave oscillator 8 in close proximity to the dielectric rings 4 so that electromagnetic coupling between the oscillator 8 and the dielectric rings 4 is achieved. The oscillator 8 preferably includes an unstable active element which, when coupled with the dielectric rings 4, forms a stable oscillator circuit having a resonant frequency determined by the spacing between the dielectric rings 4.

Each oscillator 8 preferably includes an output line 26 which carries the oscillating signal from the active oscillator 8. As described below, since only one oscillator 8 is active at a time, only a single output line 26 is required. The output lines 26 are, therefore, preferably all connected together in parallel.

The electronic measuring system of the present invention is preferably controlled by a conventional microprocessor 14 which controls the timing of various system circuits. The oscillator 8 in each load cell is preferably controlled by a multiplexed power signal 16 which activates the oscillator 8 when selected by a conventional multiplexor 18. The multiplexor 18 is preferably connected to a 12 V power supply which is applied selectively to the various oscillators 8 by the multiplexor 18 responsive to a control signal provided from the microprocessor 14. The microprocessor 14 preferably signals multiplexor 18 to sequentially provide power from the power supply to each of the various load cells 2 for a predetermined length of time, such as 2 milliseconds, by way of example. Therefore, at any given time, preferably only one load cell 2 will have an active oscillator 8.

The output of the active load cell 2, at any given time, is preferably directed, via output line 26, to a conventional microwave frequency counter 20 which measures the frequency of the active load cell 2 output. The load cell 2 output frequency, as measured by the microwave frequency counter 20, closely corresponds with the resonant frequency of the dielectric rings 4.

The microwave frequency counter 20 then preferably generates a digital output signal corresponding to the resonant frequency of the active load cell 2. This digital output signal is preferably received by a frequency-to-weight indicator 22 which, as will be explained hereinafter, converts this information into a weight indication. In this regard, since the resonant frequency of the dielectric rings 4 is now known, the frequency-to-weight indicator 22 is preferably able to calculate the spacing of the dielectric rings 4 based upon a predetermined resonant characteristic for the load cell 2 which relates the resonant frequency to the dielectric ring 4 spacing. Once the dielectric ring spacing 4 is known, the frequency-to-weight indicator 22 computes the magnitude of the weight applied to the load cell 2 based upon a predetermined response characteristic for the load cell 2 which relates the magnitude of the applied load to the deflection of the dielectric rings 4.

For example, a typical dielectric ring 4 pair might be known to resonate at 2.1 Ghz at a dielectric ring spacing of 0.5 mm. The load cell 2 support in which the dielectric ring 4 pair is mounted might be known to deflect 0.5 mm under a load of 10 KG. Thus, in the above example, if the microwave frequency counter 20 measures a resonant frequency of 2.1 Ghz, this signal is sent to the frequency-to-weight indicator 22 which determines from the known characteristics for the dielectric rings 4 and the load cell 2 that a value of 10 KG should be displayed. Alternatively, if more than one load cell 2 were in use with a large platform 9, the frequency-to-weight indicator 22 might store the values of each load cell 2 and sum these values to display the composite weight of the load on the scale.

Control lines are also preferably provided from the microprocessor 14 to the microwave frequency counter 20 and the frequency-to-weight indicator 22. These control lines preferably assure proper synchronization between the load cells 2 and system displays or outputs. For example, as the microprocessor 14 switches power between the various load cells 2 in conjunction with the multiplexor 18, the frequency-to-weight indicator 22 must be signalled so that it may process the new input accordingly (i.e. to sum the values of the load cells 2 to produce a composite output of total weight). Also, the microwave frequency counter 20 must be signalled when to begin measuring the frequency of a new input, for example.

The frequency-to-weight indicator 22 is preferably attached to a conventional LCD display 25. Alternatively, it may be connected to a computer or other peripheral device, if desired.

In practice, the active microwave load cell of the present invention might be used in a truck scale, for example. In this configuration, eight load cells 2 might be used at the base of large weighing platform as shown in FIG. 3. Such weighing platforms are commonly known. Assuming a truck weighing 100,000 lbs. were to be weighed and were placed on the scale so that the load were distributed as shown in Table 1.

TABLE 1

| Load Cell | Weight |
|---|---|
| 1 | 12.5 K lbs. |
| 2 | 12.5 K lbs. |
| 3 | 25.0 K lbs. |
| 4 | 0.0 K lbs. |
| 5 | 0.0 K lbs. |
| 6 | 12.5 K lbs. |
| 7 | 25.0 K lbs. |
| 8 | 12.5 K lbs. |

Preferably, the oscillator 8 is designed so that its resonant frequency, in conjunction with the dielectric rings 4, is in the microwave band, most preferably between 1 and 12 Ghz. In the above example of a truck scale, the load cell 2 is preferably designed to deflect linearly over the allowable range of dielectric ring 4 spacing at a load varying from 0 lbs. to 50 K lbs. with the oscillation frequency preferably linearly varying inversely with load from 2.2 Ghz at no load to 1.8 Ghz at 50 K lbs. load.

Table 2 shows some sample load points for such a load cell 2.

TABLE 2

| Load | Oscillation Frequency |
|---|---|
| 0.0 lbs. | 2.2 Ghz |
| 12.5 K lbs. | 2.1 Ghz |
| 25.0 K lbs. | 2.0 Ghz |
| 37.5 K lbs. | 1.9 Ghz |
| 50.0 K lbs. | 1.8 Ghz |

FIG. 5 A-D shows sample outputs from the various system components for the above example 1. FIG. 5A shows the oscillator power supply pulse to the various load cells 2. The supply pulse is preferably sustained, in the above example, for 2 milliseconds to each cell 2. FIG. 5B shows a sample output from the various microwave oscillators 8. FIG. 5C shows the gate during which the frequency counter 20 measures the resonant frequency of the load cell 2. Before the microwave frequency counter 20 is signalled by the microprocessor 14 to begin measuring the output frequency 26, a 0.5 milliseconds delay is preferably used to allow the frequency output to stabilize. Thereafter, as shown in FIG. 5D, the microwave frequency counter 20 measures the output frequency of the oscillator 8 which, in the above example, will be a frequency between 1.8 Ghz and 2.2 Ghz. This output is preferably directed to the frequency-to-weight indicator 22 which converts this frequency to a load value according to Table 2. These load values for the various load cells 2 are then preferably stored by the frequency-to-weight indicator 22. Once the readings from all eight load cells 2 have been read and stored, the frequency-to-weight indicator 22 may sum the stored values to produce a composite of the total load on the scale or store the values to do signal processing and/or noise reduction.

Figure 4:
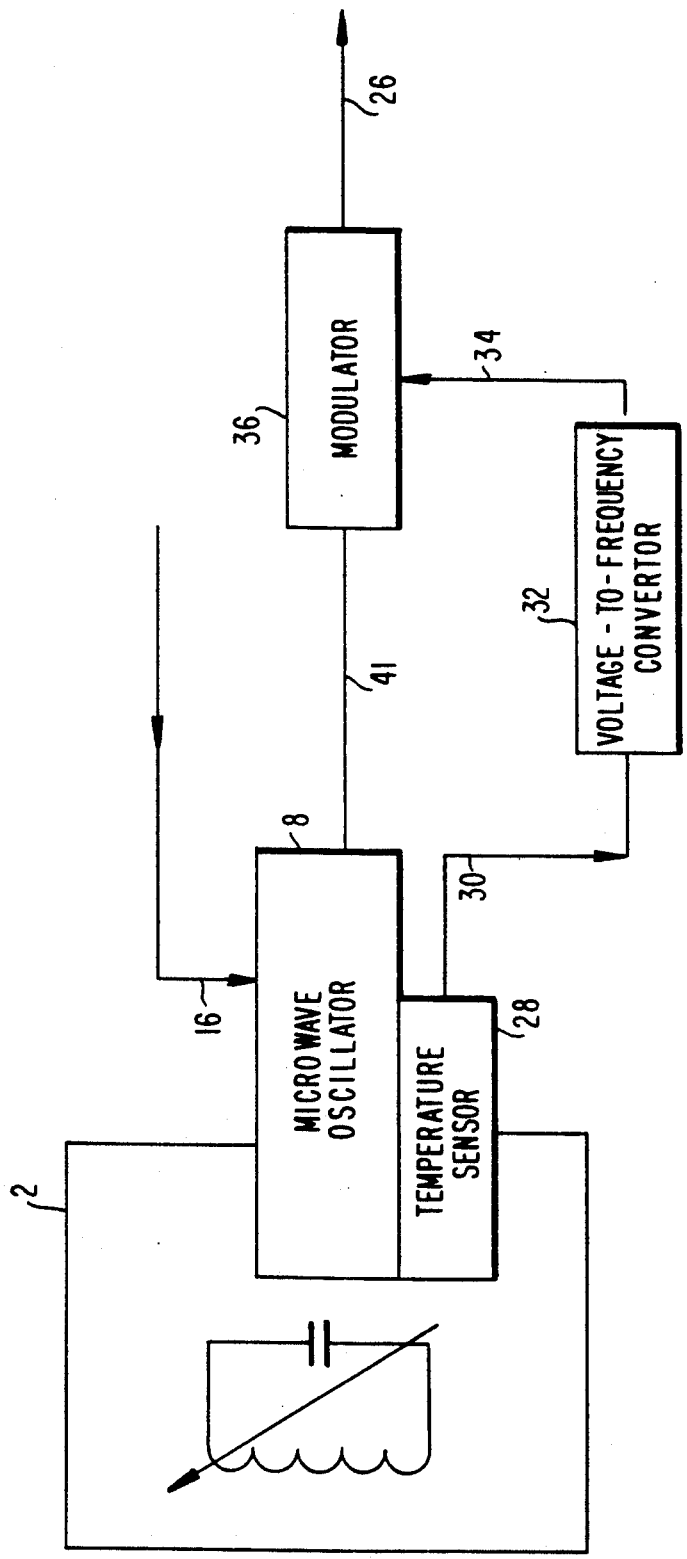
FIG. 4 shows a block diagram of the microwave load cell of the present invention in a weighing system including temperature compensation.
Figure 5A:
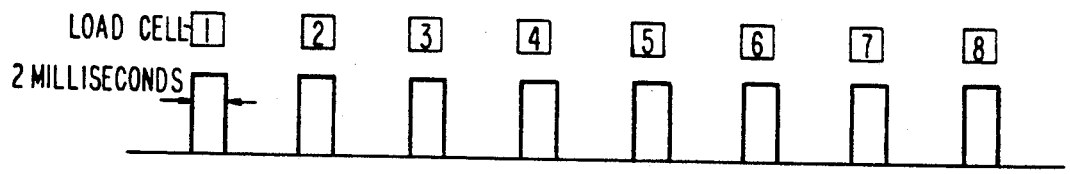
FIGS. 5 A-D show sample outputs for the components in Example 1.
Figure 5B:
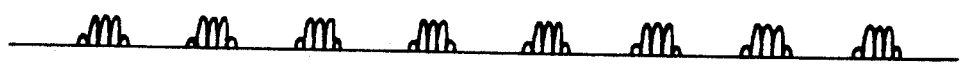
Figure 5C:
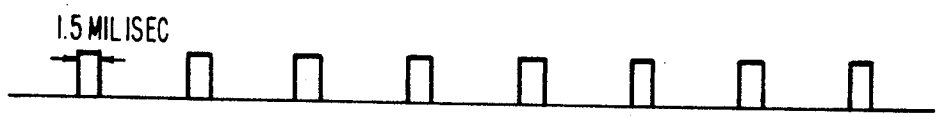
Figure 5D:
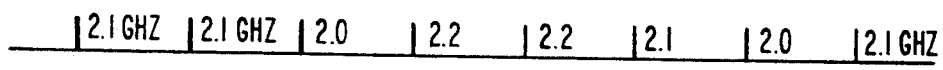

If desired, the load cell 2 of the present invention may also include a compensation for temperature variation as shown in FIG. 4. Ordinarily, temperature variations in the support components of the load cell 2 will cause expansion and contraction so as to alter the spacing of the dielectric rings 4. Therefore, preferably in close proximity to the load cell 2, a temperature sensor 28 is provided. Temperature sensor 28 is preferably a conventional integrated circuit which varies a voltage output linearly with temperature. Alternatively, temperature sensor 28 may be any conventional temperature measuring device.

In a preferred embodiment, temperature sensor 28 has an output line 30 having a voltage which varies substantially linearly from 0-1 V over a predetermined temperature range. Output line 30 is preferably directed to a conventional voltage-to-frequency convertor 32 which by way of example, linearly converts the 0-1 volt reading to a 0-20 Khz frequency output 34. This frequency output 34 is preferably then modulated, by way of example, onto the 1.8-2.2 Ghz microwave oscillator output 41 carrier by a conventional modulator 36. In this embodiment, only a single output line 30 is needed from the scale platform 9, this line 30 carrying both the load cell 2 output as a 1.8-2.2 Ghz carrier, and the 0-20 Khz temperature value modulated thereon. Any conventional modulation technique may be utilized, including AM, FM, or pulse modulation, by way of example.

A conventional demodulator 38 is preferably provided to remove the original 0-20 Khz temperature output signal from the carrier. The demodulator 38 may be of any conventional type corresponding to the modulation technique utilized by the modulator 36. Once the temperature signal is removed from the carrier, any conventional means is preferably utilized for converting the RF signal to a digital value to be read by the microprocessor 14. The microprocessor 14 preferably includes a look up table, or other conventional means, for converting the digital temperature reading to an accurate temperature value. This temperature value is then preferably used to correct the dielectric ring 4 spacing determination by the frequency-to-weight indicator 22 for any temperature related deformities in the load cell 2, so as to produce a temperature corrected load value for each particular load cell 2.

As described above, the present invention advantageously provides for the use of multiple loads cells 2 including temperature compensation with only a single output line 26 from the load cells 2. In a truck scale application, for example, the scale and load cells might be outside, with the single output line preferably being routed to a remote location where the output information is processed. If desired, conventional isolation circuitry may be included on output line 26 to isolate the processing components from the load cell 2 components for protection against lightning, by way of example.

Figure 6:
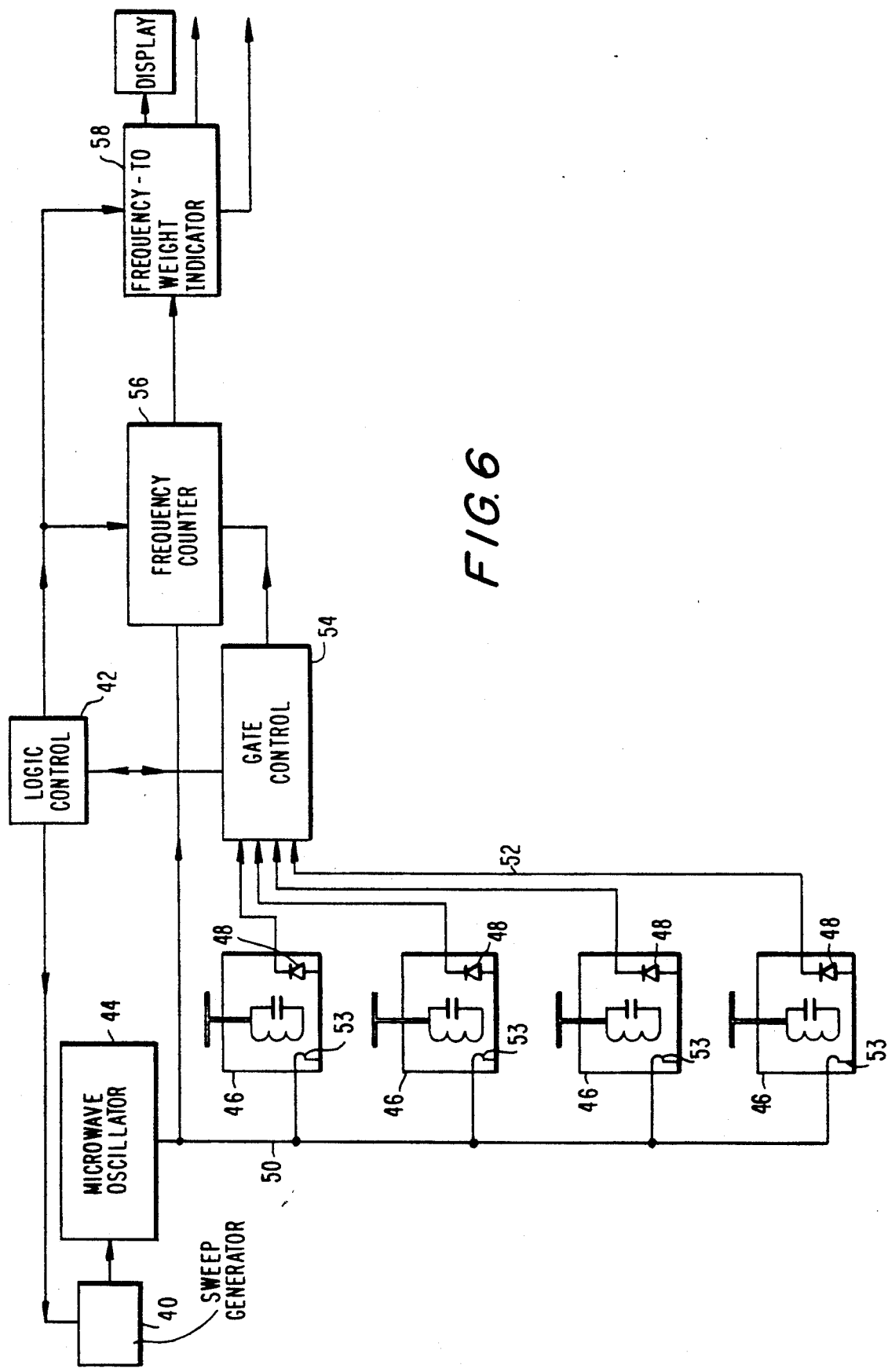
FIG. 6 shows a block diagram of the microwave load cell of the present invention in a passive mode.

As shown and preferred in FIG. 6, alternatively, if desired, the system of the present invention may be configured in a passive mode. In such an instance, a conventional sweep generator 40 preferably generates a linear voltage output in response to a triggering signal from a logic control 42, such as provided by a conventional microprocessor. The linear voltage output from the sweep generator 40 is preferably received by a conventional voltage controlled microwave oscillator 44 which generates a sweeping frequency microwave signal responsive to the linear voltage input. In a preferred embodiment, by way of example, the frequency output of the microwave oscillator 44 is swept linearly from 1.5 to 2.5 Ghz. However, this sweep range may vary based upon the particular load cell design as described below.

The sweeping microwave signal output from the microwave oscillator 44 is preferably simultaneously directed to all of the load cells 46 via the input line and applied across the spaced dielectric rings 4 contained therein via a input coupling 52. The signal may be applied across the spaced dielectric rings 4 by any conventional coupling means, such as, for example, magnetic coupling (i.e. inductive loop), aperture coupling, or electrostatic coupling. The input coupling 52 is preferably placed in close proximity to the pair of spaced dielectric rings 4 so that electromagnetic coupling is achieved. When the sweeping microwave input 50 reaches the resonant frequency of the spaced dielectric rings 4, a pulse is preferably generated which is detected by a detector 48. The detector 48 receives a varying output from the load cell 46 as the input frequency changes, such as due to harmonics. However, a threshold is preferably determined, which will preferably be exceeded only when the input frequency to the load cell 46 is the primary resonant frequency of the dielectric rings 4. Because the resonant frequency of the dielectric rings 4 varies with the dielectric ring 4 spacing, and the dielectric ring 4 spacing varies with applied load, the frequency at which the output pulse will occur corresponds directly with the load applied to the cell 46.

Preferably, the detector 48 is any device capable of detecting the output pulse from the resonator, such as a diode, FET, or transistor. Such detectors 48 are commonly known in the art.

Since all of the load cells 46 preferably receive the microwave input simultaneously in this embodiment, it is presently preferred to multiplex the outputs 53 from the various detectors 48 so that only one is selected at given time. Logic control 42 provides the necessary control signal for a multiplexor within a frequency read-out gate control 54 to sequentially select a single output 53 from the load cells 46. When a pulse is received from the detector 48, it is preferably given a square shape and transmitted to a microwave frequency counter 56.

The microwave frequency counter 56 preferably receives as an input the sweeping microwave signal 50 from the microwave oscillator 44. When a pulse is detected from the gate control 54, the microwave frequency counter 56 preferably samples the frequency on line 50, and measures its frequency via conventional means, this frequency being the resonant frequency of the selected load cell 46. This frequency is preferably transmitted to a frequency-to-weight indicator 58 where it is stored and processed in the same manner as previously described for the active mode system.

In operation, the sweep generator 40 is preferably triggered to sweep at a 200 Hz rate, by way of example, the multiplexor for the load cell 46 outputs preferably being switched at the same rate.

As an example, it may be desired to use the present invention in a passive mode as a truck scale using four load cells 46, one at each corner of a loading platform. If a 40 K lb. weight were on the scale, its weight might be distributed as follows:

| Load Cell | Load |
| --- | --- |
| 1 | 20.0 K lbs. |
| 2 | 3.0 K lbs. |
| 3 | 2.0 K lbs. |
| 4 | 15.0 K lbs. |
| Total | 40.0 K lbs. |

If each load cell 46, in the above example, has a capacity of 50 K lbs., and the load cells 46 have a resonant frequency of 1.8-2.3 Ghz over a full range of weight, the outputs as shown in FIG. 7 would result. FIG. 7A shows the range of weights for the load cells 46. FIG. 7B shows the corresponding resonant frequencies for the load cells 46 at each weight. Note, that in this example, the resonant frequency for the load cells 46 is lower at higher weights. FIG. 7C shows the sweep frequencies for the microwave source 44. In this example, the source 44 sweeps 1.7-2.4 Ghz. FIG. 7 D-G shows the output for each of the four load cells 46, respectively. Load cell 1 will resonate at approximately 2.1 Ghz, load cell 2 will resonate at approximately 2.28 Ghz, load cell 3 will resonate at approximately 2.27 Ghz, and load cell 4 will resonate at approximately 2.15 Ghz.

The dielectric rings 4 of the present invention are substantially aligned along a longitudinal axis A-A as shown in FIG. 9. Therefore, the support structure used for the load cell must preferably minimize lateral movement of the dielectric rings 4, while allowing longitudinal movement of the dielectric rings 4 not to exceed the allowable predetermined ring spacing range d. FIG. 8 shows various structures which may support the dielectric rings 4. In each diagram, the load is indicted by arrow or arrows L.

Figure 8A:
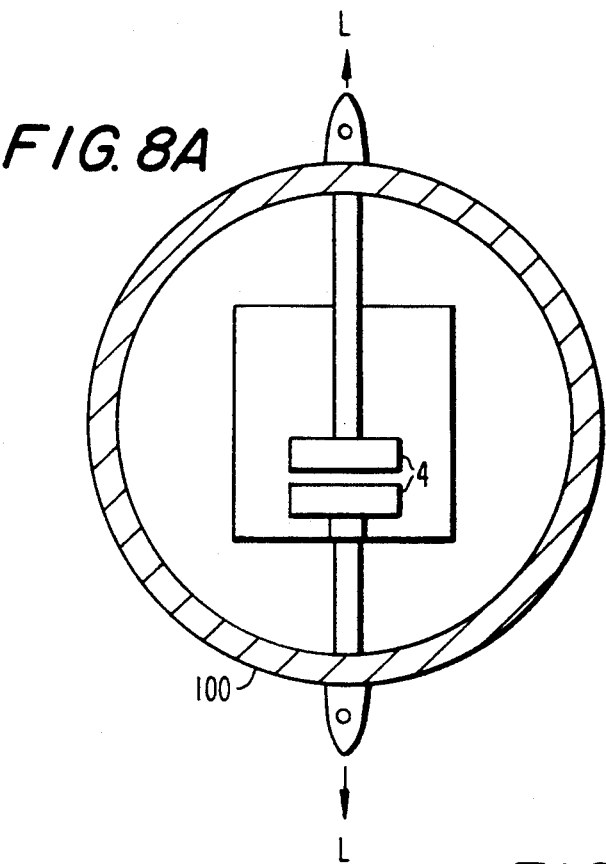
FIGS. 8 A-G show various spring designs for supporting the microwave load cell of the present invention.

FIG. 8A shows a proving ring spring design. The dielectric rings 4, in FIG. 8A, are supported in a proving ring 100 which compresses or expands as a function of the loading applied to it, thus changing the gap of the microwave resonator.

Figure 8B:
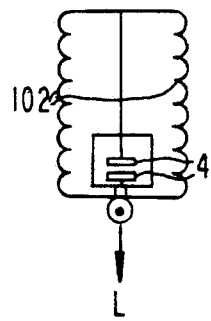

FIG. 8B shows a conventional spring design which employs, for example, coil springs 102 or spring washers to support the load. The springs will elongate or compress as a function of load.

Figure 8D:
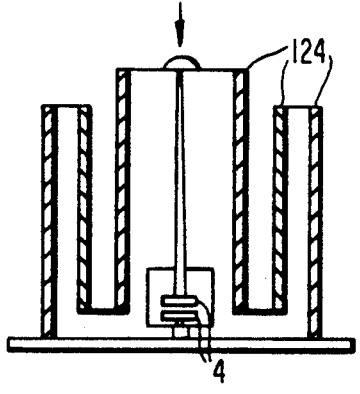
Figure 8C:
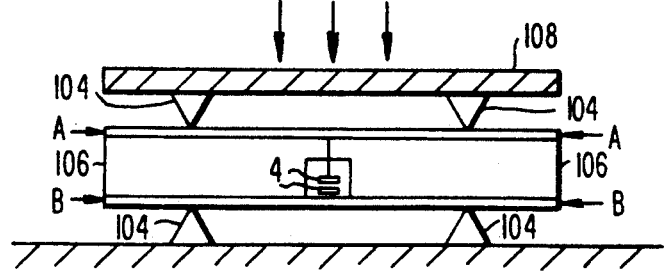

FIG. 8C shows a diagram of a suspension beam design support for the load cell. In this design, weight on a loading deck 108 is applied to two beams A and B. The beams A and B will bend as a function of load, thus changing the gap in the microwave resonator. The loading to the bending beams A and B is preferably accomplished by means of conventional pivots 104 and spacer flectures 106. This design has the advantage that the load cell becomes part of the structure of the weighing platform.

FIG. 8D employs a plurality of concentric cylinders 124 which compress when placed under a load. This causes the gap between the dielectric rings 4 to change. Cylinder designs are advantageous in high load application due to their limited compression.

FIG. 8E is a diagram of a simple bending beam support structure. In this design, the load causes a beam 110 supported at one end to deflect, thereby varying the gap in the resonator elements.

FIG. 8F is a diagram of a compound bending beam design. In this design, beam 112 is supported at both ends. Whereas a simple bending beam might tend to deflect in a arc, the motion of the beam in this design is perpendicular to the beam.

FIG. 8G is a diagram of a torsion bar spring design. a torsion bar 114 is supported by a bearing block 116 and a support member 118. In this design, the microwave element is supported by a lever 120 which has a load placed upon it. The lever rotates in proportion to applied torsion and causes a deflection in the dielectric ring 4 gap.

These spring designs per se are commonly known in the art. It is readily foreseen that any appropriate support structure may be used to allow the necessary movement of the dielectric rings 4 under a load.

Although the present invention has been described in detail with respect to certain embodiments and examples, variations and modifications exist which are within the scope of the present invention as defined in the following claims.

What is claimed is:

1. A microwave load measuring system which comprises:
    at least one load cell comprising at least two dielectric rings spaced along a longitudinal axis and having a resonant frequency varying substantially linearly with said spacing over a range of said spacing, said dielectric rings having a predetermined resonant characteristic relating at least said resonant frequency at a given time to said dielectric ring spacing at said given time; support means for spaceably mounting said dielectric rings, said support means deflecting in response to an applied load, said dielectric rings being movable along said longitudinal axis within said range, said ring spacing varying substantially linearly responsive to the magnitude of said load applied to said support means, said support means having a predetermined response characteristic relating at least said dielectric ring spacing at said given time to the magnitude of said applied load at said given time; means for applying a microwave signal across said dielectric rings for generating an output signal having a frequency substantially corresponding to said resonant frequency, at said given time; and means for measuring said output signal frequency at said given time for determining the magnitude of said applied load at said given time in accordance with said response characteristic and said resonant characteristic.

2. A microwave load cell according to claim 1 wherein
    said support mean is selected from the group consisting of proving ring, conventional spring, suspension beam, concentric cylinder, simple bending beam, compound bending beam, and torsion bar spring.

3. A microwave load measuring system according to claim 1 wherein said means for applying said microwave signal comprises a microwave frequency oscillator circuit having an unstable oscillator element in close proximity to said pair of dielectric rings in said at least one load cell, said dielectric rings coupling with said unstable oscillator element and generating said output signal at a stable oscillating frequency substantially corresponding with said resonant frequency of said dielectric rings, said oscillator circuit being controlled by a microprocessor generated control signal, only one oscillator being activated at a particular time, said output signal corresponding to the resonant frequency of the dielectric rings in close proximity to said active oscillator; and said measuring means comprises frequency determining means for receiving said output signal and measuring the oscillation frequency of said output signal, said frequency determining means generating a digital frequency output corresponding to said oscillation frequency, and frequency-to-weight conversion means for receiving said digital frequency output and determining the spacing of said dielectric rings in close proximity to said active oscillator according to said resonant characteristic, said dielectric ring spacing being used to determine the magnitude of said applied load according to said response characteristic; said system further comprising means for generating an output electrical signal corresponding to the magnitude of said applied load.

4. A Microwave load measuring system according to claim 3 further comprising:
   each of said at least one load cell further comprising:
   temperature measuring means in close proximity to said dielectric rings for generating an electrical temperature signal substantially corresponding to the temperature of said dielectric rings and said support means, means for converting said electrical temperature signal to an RF temperature signal and for modulating said RF temperature onto said stable oscillating frequency signal as said output signal, said output signal comprising said stable oscillating frequency signal corresponding to said resonant frequency of said dielectric rings as a carrier signal, and said RF temperature signal modulated thereon;
   means for demodulating said output signal for separating said RF temperature signal from said stable oscillating frequency signal and for determining said temperature of said dielectric rings and said support means according to a predetermined relationship relating said RF temperature signal to said dielectric rings and support means temperature and for generating a signal corresponding to said temperature, said frequency-to-weight conversion means receiving said temperature and compensating for said temperature in determining the magnitude of said load.

5. A microwave load measuring system according to claim 1 wherein said means for applying said microwave signal comprises microprocessor controlled means for repetitively generating a sweeping microwave signal, said signal sweeping over a range of frequencies at least corresponding to a range of said resonant frequency of said dielectric rings over said range of dielectric ring spacing, said sweeping microwave signal being applied across said pair of spaced dielectric rings as an input, said pair of spaced dielectric rings electromagnetically coupling with said input and generating a varying resonance signal, said varying resonance signal being a detectable pulse signal at an input frequency substantially corresponding to said resonant frequency.

6. A microwave load measuring system according to claim 5 comprising a plurality of said load cells each comprising a pair of said spaced dielectric rings movable along said longitudinal axis within said range in response to said applied load; said sweeping microwave signal being applied across each of said pairs of spaced dielectric rings as an input; said means for applying said microwave signal further comprising microprocessor controlled multiplexing means for sequentially signalling a pulse detection means to select a particular load cell of said plurality of load cells for detecting said detectable pulse from said particular selected load cell and for substantially simultaneously signalling a frequency determining means to sample the oscillation frequency of said input signal, said oscillation frequency of said input signal corresponding to the resonant frequency of said spaced dielectric rings of said particular selected load cell and being used as said output signal, said output signal frequency measuring means generating a digital frequency output corresponding to the frequency of said output signal frequency and further comprising frequency-to-weight conversion means for receiving said digital frequency output and determining the spacing of said dielectric rings according to said resonant characteristic, said dielectric ring spacing being used to determine the magnitude of said applied load according to said response characteristic; said system further comprising means for generating an output electrical signal corresponding with the magnitude of said load.

7. A microwave load measuring system which comprises:
   a microwave load cell comprising at least one dielectric ring and a conductive surface spaced along a longitudinal axis, the combination of said one dielectric ring and said conductive surface having a resonant frequency varying with said spacing over a range of said spacing and having a resonant characteristic relating at least said resonant frequency to said spacing at any given time; support means for spaceably mounting said one dielectric ring and said conductive surface, said one dielectric ring being movable along said longitudinal axis within said range, said spacing varying substantially linearly responsive to the magnitude of a load applied to said support means at any given time, said support means having a response characteristic relating at least said spacing to the magnitude of the load applied at a given time; means for applying a microwave signal across said load cell for generating an output signal having a frequency substantially corresponding to said resonant frequency at said given time; and means for measuring said output signal frequency at said given time for determining the magnitude of said applied load at said given time in accordance with said response characteristic and said resonant characteristic.

8. A microwave load cell according to claim 7 wherein
   said support means is selected from the group consisting of proving ring, conventional spring, suspension beam, concentric cylinder, simple bending beam, compound bending beam, and torsion bar spring.

9. A microwave load measuring system according to claim 7 wherein said means for applying said microwave signal comprises a microwave frequency oscillator circuit having an unstable oscillator element in close proximity to said dielectric ring and said conductive surface in said at least one load cell, said dielectric ring and said conductive surface coupling with said unstable oscillator element and generating said output signal at a stable oscillating frequency substantially corresponding with said resonant frequency of said dielectric ring and said conductive surface, said oscillator circuit being controlled by a microprocessor generated control signal, only one oscillator being activated at a particular time, said output signal corresponding to the resonant frequency of the dielectric ring and said conductive surface in close proximity to said active oscillator; and said measuring means comprises frequency determining means for receiving said output signal and measuring the oscillation frequency of said output signal, said frequency determining means generating a digital frequency output corresponding to said oscillation frequency, and frequency-to-weight conversion means for receiving said digital frequency output and determining the spacing of said dielectric ring and said conductive surface in close proximity to said active oscillator according to said resonant characteristic, said spacing being used to determine the magnitude of said applied load according to said response characteristic, said system further comprising means for generating an output electrical signal corresponding to the magnitude of said applied load.

10. A microwave load measuring system according to claim 7 wherein said means for applying said microwave signal comprises microprocessor controlled means for repetitively generating a sweeping microwave signal, said signal sweeping over a range of frequencies at least corresponding to a range of said resonant frequency of said dielectric ring and said conductive surface over said range of said spacing, said sweeping microwave signal being applied across said spaced dielectric ring and said conductive surface as an input, said spaced dielectric ring and said conductive surface electromagnetically coupling with said input and generating a varying resonance signal, said varying resonance signal being a detectable pulse signal at an input frequency substantially corresponding to said resonant frequency.

11. A microwave load measuring system according to claim 10 comprising a plurality of said load cells each comprising a pair of said spaced dielectric ring and said conductive surface movable along said longitudinal axis within said range in response to said applied load; said sweeping microwave signal being applied across each of said pairs of spaced dielectric ring and said conductive surface as an input; said means for applying said microwave signal further comprising microprocessor controlled multiplexing means for sequentially signalling a pulse detection means to select a particular load cell of said plurality of load cells for detecting said detectable pulse from said particular selected load cell and for substantially simultaneously signalling a frequency determining means to sample the oscillation frequency of said input signal, said oscillation frequency of said input signal corresponding to the resonant frequency of said spaced dielectric ring and said conductive surface of said particular selected load cell and being used as said output signal, said output signal frequency measuring means generating a digital frequency output corresponding to the frequency of said output signal frequency and further comprising frequency-to-weight conversion means for receiving said digital frequency output and determining the spacing of said dielectric ring and said conductive surface according to said resonant characteristic, said spacing being used to determine the magnitude of said applied load according to said response characteristic; said system further comprising means for generating an output electrical signal corresponding with the magnitude of said load.

* * * * *